INVENTOR.
FRANK SCHWARZ

United States Patent Office 3,081,399
Patented Mar. 12, 1963

3,081,399
RADIATION DETECTOR SYSTEMS
Frank Schwarz, Stamford, Conn., assignor to Barnes Engineering Company, Stamford, Conn., a corporation of Delaware
Filed Jan. 7, 1960, Ser. No. 1,001
9 Claims. (Cl. 246—169)

This invention relates to an improved method of operating detectors for optical radiation which change their electrical characteristic under irradiation and which require bias voltages. The invention also includes certain applications in which modified circuits of the present invention are useful.

A wide class of detectors for optical radiations, that is to say for radiations whose wavelength is such that they obey optical laws, have been devices in which the radiation results in a change in electrical conductivity or resistance of an element and so requires a biasing voltage. A number of types of such detectors are known. For example, even in the visual light range phototubes, including photomultiplier tubes, change their resistance as a result of the irradiation. Of even more importance are the various solid state detectors which are used in the infrared and which include those changing their resistance by temperature changes such as thermistors and those which like the phototubes respond to irradiation with photons, using photons in the broad sense of packages of electromagnetic radiation regardless of its wavelength. This latter form of solid state detector is exemplified by various photoconductors. In every case a biasing voltage has been necessary because the change in resistance will not result in a change in electrical signal unless there is some biasing voltage so that the change may be interpreted as a change in current.

The nature of the biasing voltages used is important. For practical purposes only D.C. biasing has been used because of considerations of noise and also because of the ease with which its voltage may be stabilized. In the following discussion infrared detectors will be dealt with as illustrative as infrared is the field in which the present invention presents its greatest advantages. However, it should be realized that the invention is in no sense limited to detectors which operate only in the infrared but is applicable to any type of detector requiring a bias voltage.

The necessity of a D.C. bias in detectors, such as infrared detectors, for example, thermistor bolometers or solid state photoconductors, has resulted in a number of serious disadvantages. While for certain purposes a D.C. radiometer is practical the electrical amplification and processing of the output signal leaves much to be desired. D.C. amplifiers are particularly subject to drift, low frequency noise and to other electrical disadvantages. In the case of transient radiation signals such as, for example, targets moving rapidly through the field of view of a radiometer, the ordinary D.C. biased detector operates satisfactorily. For most other uses, however, it is necessary that the signal be processed in the form of an A.C. signal so that the best type of selective amplifiers and other data processing circuits may be employed. This has necessitated some means of interrupting the beam. In many cases this is effected by chopping the beam which may be combined with alternate comparisons with radiations from a reference body such as a black body cavity. Scanning arrangements may also be used. Instruments in which the beam of radiation is interrupted or moved constitute the standard today and on them the major portion of infrared instrumentation is based. They have, however, serious disadvantages. In most of these, moving parts are involved, weight is increased, complication is increased and other disadvantages have been encountered. The saving in weight and moving parts is of great importance in such fields as missile and satellite instrumentation.

The present invention deals with A.C. biased detectors and instruments using them. When A.C. bias is present the problem of electrical amplification and processing becomes simple. However, hitherto A.C. biasing has not been practical except in certain nonsensitive installations, such as heat detectors in electric range burners which prevent overheating of cooking utensils. Here the raw A.C. applied as a bias operates satisfactorily because the devices are unconcerned with noise considerations. This is not true, however, with most infrared instruments where noise is usually the limiting factor and for this reason A.C. biasing has not been considered applicable to precision infrared instruments.

The present invention solves the problem by utilizing circuits which produce very low noise A.C., and provide a very stable voltage from a low impedance source. The importance of the first factor is, of course, at once apparent. The second factor requires a little closer consideration. It is impossible to produce any source of A.C. which is completely noise free. The source used in the present invention generates extremely low noise and the effect of the noise may be negligible because most radiation detectors have fairly high impedances or at least their impedance could not be characterized as extremely low and generates considerable Johnson noise or in some instances photons and current noise which may be much greater than the noise in the bias supply. As a result amplifiers and other data processing circuits receiving their outputs also have fairly high input impedances to match that of the radiation detector itself. The greatly improved signal to noise ratio for the first time makes A.C. biased radiation detectors practical for precision instrumentation.

Essentially the present invention employs an A.C. generator, preferably the square wave type, the output of which, or the outputs of which where more than one detector is being supplied, are shunted by one or more avalanche diodes which are frequently referred to as "Zener diodes." Although this latter designation is not as precise it is so commonly used that the diodes employed in the present invention will be referred to as Zener diodes. It should be understood that the diodes must be operating under circuit conditions where the avalanche breakdown takes place. This phenomenon, as is well known, results when the voltage on the diode in the back or nonconducting direction exceeds a certain figure determined by the nature of the semiconductors used in the diode and by its configuration, for example, stacking to obtain multiples of a basic breakdown voltage for a single diode element. Once the breakdown voltage is reached current increases very rapidly and in effect prevents any further change in voltage. When an A.C. generator is shunted by one or more Zener diodes of suitable breakdown voltages the output is clipped, usually in the form of a square wave, and the output is both of low noise and of very low impedance, and stable voltage, the three factors which make the present invention possible.

Reference has been made to using a square wave generator. This has the advantage, when the Zener diodes are suitably chosen, of producing a square wave bias voltage which does not have dead spots and, therefore, utilizes the whole of the A.C. cycle. The invention is not limited to the use of square wave generators as a sine wave generator shunted by Zener diodes will also produce an output which is clipped. Since, however, the Zener breakdown voltage is considerable the resulting square waves will not utilize the complete cycle. The device is entirely operable but is less efficient and may even be more noisy. In this connection it might be pointed out that the fact that the Zener diodes produce a square wave output makes it unnecessary to use a square wave generator of extremely high precision which permits considerable design economies.

A single Zener diode will produce square pulses but only for half a cycle. Therefore, it is preferable, although the invention is not absolutely limited thereto, to use more than one Zener diode connected back to back. Any desired breakdown voltage which determines amplitude of the square wave A.C. voltage used for bias can be obtained with currently available Zener diodes and so it is a simple matter to produce A.C. bias voltages of the right order of magnitude for the particular detector or detector operation contemplated. This great flexibility is a marked practical advantage of the invention.

The frequency of the A.C. voltage is not critical and does not have to be very low in order to match the time constant of the particular radiation detector. This is a very important characteristic of the present invention, and the detector output in the cases of higher frequency than its time constant may be considered as the bias frequency amplitude modulated by the radiation on the detector and so when the signal has been processed with amplifiers suitable for the bias voltage frequency, rectification or a similar electrical operation reproduces the envelope which corresponds to the radiation on the detector. The possibility of using high frequency A.C. bias also permits sequential use of a series of detectors in the form of a mosaic, the frequency being produced by a sweep generator and the different detectors having different tuned amplifiers producing their inputs. Only the detector receiving A.C. bias of the frequency to which its amplifier is tuned reports at any one time.

Another important advantage of the present invention is that with A.C. bias it is a simple matter to turn the bias on and off by electronic gating means. In other words a radiation detector can be activated for a predetermined interval on command which is of importance in a number of applications such as, for example, railway hot box detectors. The A.C. gating is almost instantaneous, at least in comparison with intervals of the order of magnitude of the time constant of the detector. D.C. bias on the other hand may charge up capacitors present in the circuit and reduce the speed with which gating takes place. It is a further advantage of the present invention that no such time delay need exist within this system.

The invention will be described in greater detail in conjunction with the drawing in which.

Figure 1:
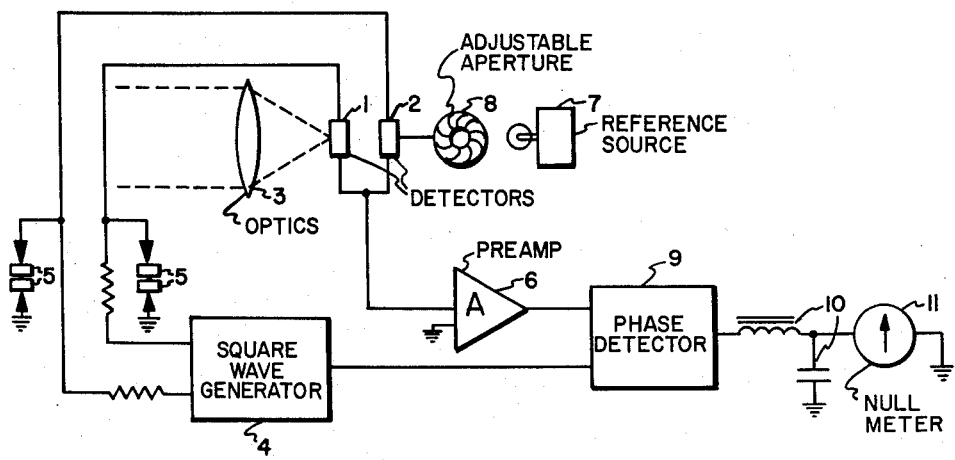
FIG. 1 is a diagrammatic representation of A.C. biased differential thermistor utilizing a reference source.

FIG. 1 shows a thermistor bolometer or photoconductor with an active flake 1, and a reference flake 2, the two flakes being connected in a differential circuit. Infrared radiation is shown diagrammatically as imaged on the detector 1 by the lens 3. The two flakes are biased from a square wave generator 4 each flake being shunted by a pair of Zener diodes 5. An A.C. preamplifier 6 receives the differential output of the two flakes. Flake 2 is illuminated from a reference radiation source 7 with an adjustable reference aperture 8. The preamplifier 6, therefore, receives a differential signal in which the active flake 1 is compared to the flake receiving reference illumination. As the two flakes receive bias from different sides of the output of the square wave generator the A.C. component of the bias is in opposite phase on the two flakes.

The differential signal from the preamplifier 6 is passed to a phase detector which receives a rectified and filtered comparison phase from the square wave generator. The final output is integrated by the choke and capacitor circuit 10 and actuates a null meter 11. If the bridge including the two flakes is unbalanced the degree of unbalance and the direction is shown by the meter.

Figure 2:
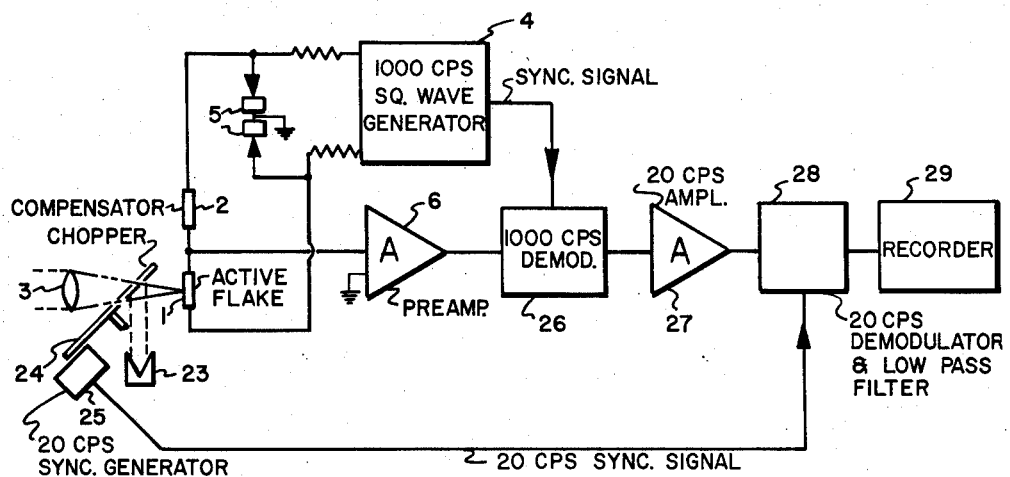
FIG. 2 is a diagrammatic representation of a differential thermistor and reference source with chopped radiation.

FIG. 2 illustrates a modified A.C. biased detector. In this figure as in succeeding figures the same parts will bear the same reference numerals as in FIG. 1. The detector which contains an active flake 1 and compensator flake 2 receives radiation through the optics 3, the beam passing through a chopper 24 of conventional design having a mirror surface on the back of the chopper blades. When the beam is obscured the mirror blade reflects radiation from a reference black body 23. The rotation of the chopper is at 20 c.p.s. and it actuates a sync generator 25 of conventional design. The detector flakes are biased from the 1,000 c.p.s. generator 4, shunted as in FIG. 1 by a pair of Zener diodes 5. In this case, however, the diodes shunt the whole bias output instead of individually shunting each side of the output.

The differential signal from the active and compensator flakes, which is chopped at 20 cycles as well as having the thousand cycle A.C. bias, is amplified in the preamplifier 6 which feeds a demodulator synchronized by a signal from the square wave generator. The output of the demodulator passes through a 20 c.p.s. amplifier 27 and is fed into a 20 c.p.s. demodulator and low pass filter 28. This demodulator receives a sync signal from the sync generator 25. The final output actuates a recorder 29 of conventional design.

The response of the detector to radiation is at a frequency of 20 cycles which rides on a carrier frequency of 1,000 cycles from the bias generator 4. This permits using small and light amplifiers tuned to a higher frequency than that of the detector signal and thus there is an effective discrimination against low frequency noise which is particularly advantageous in transistorized preamplifiers. The carrier frequency can be selected to minimize noise and hence improve signal to noise ratio. After demodulation the further amplification is at low frequency in amplifier 27 and this in turn is demodulated in the phase sensitive demodulator 28 which receives a 20 c.p.s. sync signal from the sync generator. As a result an output is obtained which distinguishes between the phases of the signal from radiation and reference source. The early demodulation eliminates the 1,000 cycle signal from detector unbalance before it has been amplified to high levels. After demodulation only the desired signal is amplified allowing utilizing the full dynamic range of amplifier 27.

Figure 3:
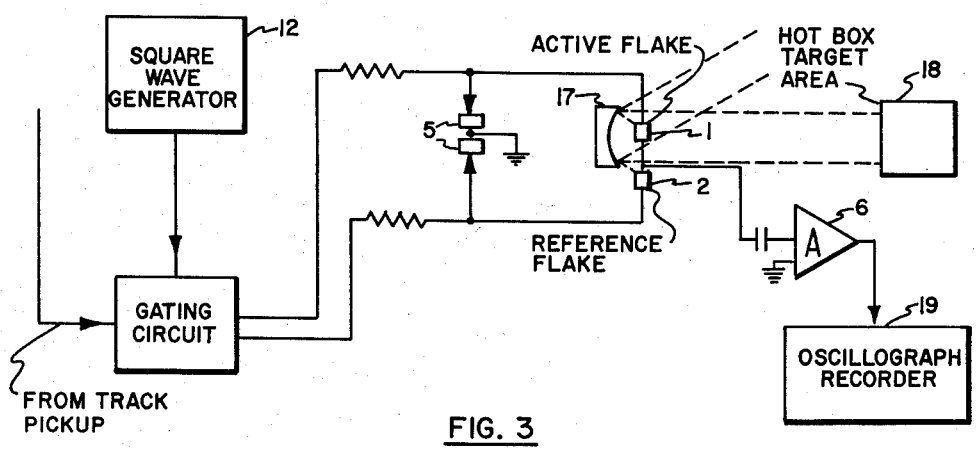
FIG. 3 is a diagram of a hot box detector utilizing an A.C. biased thermistor bolometer.

FIG. 3 illustrates the application of the present invention to a hot box detector. Here the problem is to activate the detectors 1 and 2 of the radiometer when a wheel is passing. The radiometer includes reflective optics 17 imaging the hot box target 18 on one of the detector flakes. Bias is provided from the square wave generator 12 through a transistorized gating circuit provided with a monostable or one shot multivibrator of conventional design. In its stable position the square wave from generator 12 is not passed but on receiving a pulse from a track pickup of conventional design (not shown), when a car wheel is passing, the one shot multivibrator conducts thus putting A.C. bias on the two thermistor flakes with the paired Zener diodes 5 in shunt. The R.C. characteristics of the gating circuit are so chosen that the gate remains open for a definite period of time which is less than the time for passage of the wheel journal at maximum car speeds. The differential output from the detector is amplified in the amplifier 6 and operates a recorder 19 which provides a record of the pulses as each journal box passes.

The circuit of FIG. 3 activates the radiometer only while it sees the hot box and as a result response from exposure to undesired portions of the passing wheel or other objects is avoided. In the more customary hot box detectors which have been developed this feature requires mechanical interruption of the beam from the hot box to the radiometer, for example, by a mechanically operated shutter. The present invention permits electronic control for the period of exposure which eliminates moving parts and permits a rugged and uniformly operating system. The amplitude of the pulse for identical temperature differentials is thus independent of train speeds.

Figure 4:
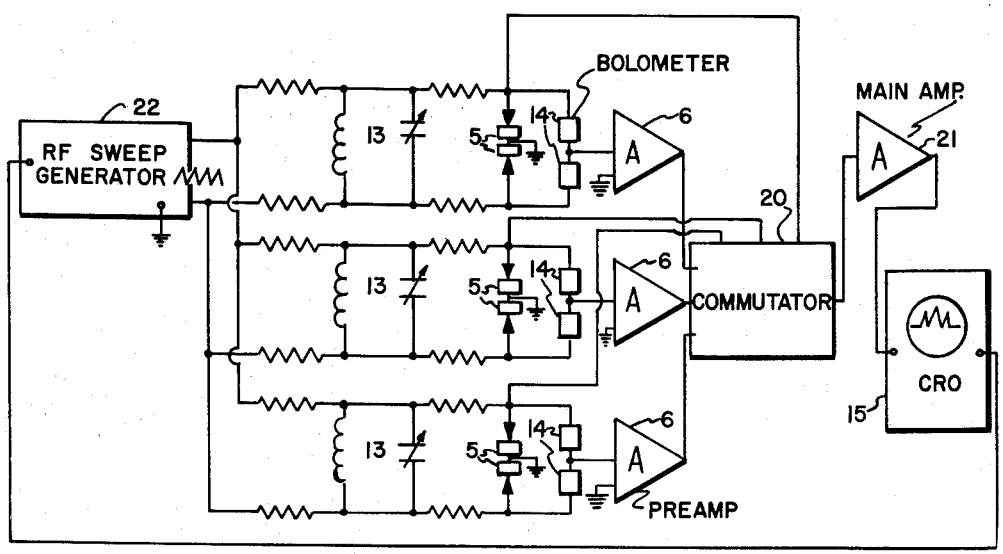
FIG. 4 is a diagram of multiple detectors biased with a swept A.C. frequency.

FIG. 4 shows an electronic scannnig system utilizing the A.C. biased detectors of the present invention. In this modification an R.F. sweep generator 22 sweeps through a predetermined frequency band at a definite sweep frequency in the form of a saw tooth wave as illustrated. The output of the generator feeds a series of tank circuits 13 which in turn are connected to thermistor bolometers or photoconductors 14 with dual Zener diodes 5 shunting the flakes. The detectors are of standard design, the second flake being at ambient temperature. As the generator 22 generates different R.F. frequencies the tuned circuits 13 select the particular frequency band to which they are tuned and momentarily bias their own detector. The output of each detector is amplified by preamplifier 6 and fed to a readout circuit shown in the drawing by way of illustration as a commutator 20, a main amplifier 21 and an oscilloscope 15. The oscilloscope is synchronized with the sweep frequency of the sweep generator as indicated by the connection from the generator tot he horizontal deflection circuit of the oscilloscope. A series of pulses are produced from the different detectors and the particular response of each individual detector is shown by the relative position of the pulses on the oscilloscope.

FIG. 4 shows a relatively simple array with only three detectors. The same system may be used with a mosaic in an infrared camera thus substituting electronic scanning for the mechanical or other scanning now used and eliminating the corresponding moving parts.

The specific description in conjunction with the drawings shows a number of typical uses for A.C. bias detectors of the present invention which, however, is not in any sense limited to these particular uses. On the contrary, in its broader aspects, the invention includes A.C. bias radiation detectors regardless of the instrument in which they are incorporated. In more specific aspects, however, the above described specific organizations of detectors are included.

I claim:

1. A detector for optical radiations comprising in combination,
   (a) a detector element which changes its electrical resistance in response to optical radiations,
   (b) an A.C. source the output of which is shunted by at least one pair of Zener diodes connected back to back to produce clipped square waves and
   (c) connecting means from the output of the A.C. source to the radiaiton detector to bias it.

2. A device according to claim 1 in which the radiation detector is a thermistor bolometer.

3. A detector according to claim 1 in which the A.C. source is itself a square wave generator.

4. A device according to claim 2 in which the bolometer comprises two thermistor flakes, one constituting a reference flake and an A.C. amplifier, the input of which is connected to a point in the bolometer where a differential signal between the flakes arises.

5. A device according to claim 4 in which the thermistor bolometer is a portion of a radiometer and electronic gating means are interposed between the A.C. source and the bolometer flakes.

6. A multiple array of detectors for optical radiations comprising in combination a plurality of detectors, an RF sweep generator, a series of tuned input circuits for the detectors each tuned to a separate RF band within the range of the generator sweep, a pair of Zener diodes shunting the output of each tuned circuit and means for connecting the sweep generator to the inputs of the tuned circuits.

7. A multiple array of detectors for optical radiations according to claim 6 in which the detector outputs comprise individual output amplifiers for the detectors, a commutator and readout circuit and means actuated from the detector bias inputs to actuate the commutator, switching in the output of the amplifier from each detector as the detector is biased.

8. A detector array according to claim 6 in which the detectors are thermistor bolometers.

9. In a hot box detector which comprises a radiometer provided with a detector for optical radiations which changes its electrical resistance in response to said radiations,
   (a) an A.C. source the output of which is shunted by at least one pair of Zener diodes connected back to back,
   (b) means for electrically connecting the A.C. source output to the detector to apply A.C. bias thereto,
   (c) said means including electronic gating means actuated by a car wheel pick-up.

References Cited in the file of this patent

UNITED STATES PATENTS

| | | |
|---|---|---|
| 2,850,684 | Klein et al. | Sept. 2, 1958 |
| 2,876,642 | Scorgie | Mar. 10, 1959 |
| 2,880,309 | Gallagher et al. | Mar. 31, 1959 |
| 2,947,883 | Welch | Aug. 2, 1960 |
| 2,963,575 | Pelino et al. | Dec. 6, 1960 |

FOREIGN PATENTS

| | | |
|---|---|---|
| 804,863 | Great Britain | Nov. 26, 1958 |

OTHER REFERENCES

Airborne Infrared Warning Systems Measures Range, by W. E. Osborne, from Electronics, July 1, 1957, pages 190, 192.

Infrared Detector Aids Medical Diagnosis, by W. E. Osborne, from Electronics, Oct. 1, 1957, pp. 155–157.